United States Patent [19]
Krause

[11] Patent Number: 5,648,704
[45] Date of Patent: Jul. 15, 1997

[54] METHOD AND APPARATUS FOR DIGITAL CONTROL OF RASTER SHIFT IN CRT DISPLAYS

[75] Inventor: Peter Krause, Singapore, Singapore

[73] Assignee: Apple Computer, Inc., Cupertino, Calif.

[21] Appl. No.: 505,134

[22] Filed: Jul. 21, 1995

[51] Int. Cl.⁶ .............................. H01J 29/70; H01J 29/76
[52] U.S. Cl. ................................ 315/408; 315/408
[58] Field of Search ................................ 315/408

[56] References Cited

U.S. PATENT DOCUMENTS

| | | | |
|---|---|---|---|
| 4,293,804 | 10/1981 | Yello | 315/398 |
| 4,468,593 | 8/1984 | Haferl | 315/371 |
| 4,572,994 | 2/1986 | Valkestijn et al. | 315/411 |
| 4,954,758 | 9/1990 | Rusk | 315/411 |
| 5,059,874 | 10/1991 | Oliver | 315/411 |
| 5,276,604 | 1/1994 | Messman | 363/21 |

FOREIGN PATENT DOCUMENTS

| | | |
|---|---|---|
| 2245544 | 9/1972 | Germany . |
| 5328161 | 12/1993 | Japan . |

*Primary Examiner*—Theodore M. Blum
*Attorney, Agent, or Firm*—Burns, Doane, Swecker & Mathis, L.L.P.

[57] ABSTRACT

A technique is provided for very efficiently injecting DC current into a horizontal deflection yoke to achieve raster shifting. The DC current (which is bi-directional) is used to unbalance the scan current, thereby providing a means to shift the horizontal scan raster to the left and right. This ability makes it is possible to offset symmetry problems in the yoke and CRT gun system. The amount of current and the direction of the current is both user adjustable and system adjustable, and is controlled through a microcontroller. Preferably, the microcontroller uses an H-synchronized clock generated by an on-screen display (OSD) controller, thereby avoiding the need to separately generate a high frequency clock. Using a current switching approach, low power losses are achieved in a circuit that is low cost and requires few components.

5 Claims, 6 Drawing Sheets

METHOD AND APPARATUS FOR DIGITAL CONTROL OF RASTER SHIFT IN CRT DISPLAYS

BACKGROUND OF THE INVENTION

1. Field of the Invention

The present invention relates to horizontal beam deflection in television and video display monitors, particularly to raster shifting whereby the horizontal position of a video raster on a display screen is adjusted.

2. State of the Art

In television and video display monitors using a CRT (cathode ray tube), a horizontal deflection current is produced in a horizontal deflection coil to create a magnetic field used to deflect an electron beam (produced by a cathode of the CRT) back and forth across a display screen. As the electron beam is scanned back and forth across the display screen, it is modulated to produce on the display screen spots of varying luminous intensity, thus forming an image to be viewed. A high voltage, referred to as EHT (electrical high tension), is applied to an anode of the CRT and accelerates the electron beam, causing it to strike the screen at a very high speed.

Typically, a periodic horizontal drive signal is applied to a horizontal scan output stage (i.e., a power transistor) to produce a train of high-voltage retrace pulses used to generate the horizontal retrace current within a horizontal deflection, or DY, coil. The DY coil is part of a deflection yoke of the CRT, a combination of coil windings formed so as to surround particularly a neck portion of the CRT.

Because of manufacturing uncertainties, the yoke and CRT gun system may exhibit symmetry problems. To correct these problems, raster shifting may be used to adjust the horizontal position of the video raster on the display screen. In practice, all CRTs require some amount of raster shift. For example, symmetry problems are often caused by a slanted gun mounting inside the tube, but also occur in the convergence and beam landing adjustment process.

In existing designs that provide for raster shifting, basically a DC current is injected through a inductor into the deflection yoke. The DC current is generated from a floating power supply output. The polarity and amount of raster shift is usually only manually adjustable.

Deflection yokes used for high resolution monitors tend to have very low impedance, which reduces the trace voltage but increases the scan current. In order to provide the necessary raster shift, a DC current of 1A must be provided, which requires a drive voltage of only about 0.8 V.

Modern power supplies designed for high efficiency, however, generate 3 to 4 volts per turn, which causes 3 to 4 V to be the lowest possible supply voltage. In known raster shifting circuits, when the required 1A current is supplied, high power losses are inevitable because the lowest output voltage which can be generated by the power supply is unavoidably a few times higher then needed. If, on the other hand, a non switching approach is used, a complicated drive circuit is required to make the current controllable and the H-scan rate dependable.

SUMMARY OF THE INVENTION

The present invention, generally speaking, provides a technique for very efficiently injecting DC current into a horizontal deflection yoke to achieve raster shifting. The DC current (which is bi-directional) is used to unbalance the scan current, thereby providing a means to shift the horizontal scan raster to the left and right. This ability makes it is possible to offset symmetry problems in the yoke and CRT gun system.

The amount of current and the direction of the current is both user adjustable and system adjustable, and is controlled through a microcontroller. Preferably, the microcontroller uses an H-synchronized clock generated by an on-screen display (OSD) controller, thereby avoiding the need to separately generate a high frequency clock. Using a current switching approach, low power losses are achieved in a circuit that is low cost and requires few components.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
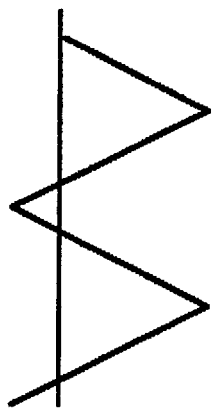
FIG. 1 is a diagram of a scan current waveform without any raster shift being applied.

As shown in FIG. 1, the scan current for a television or video display monitor, which flows within the DY coil of the deflection yoke, exhibits a sawtooth waveform. As the current increases (trace), the electron beam is scanned from left to right. As the current decreases (retrace), the electron beam is scanned rapidly back in the opposite direction, from right to left. Point A in FIG. 1 represents the scan current when the beam is at its leftmost point, and point B represents the scan current when the beam is at its rightmost point.

Figure 2:
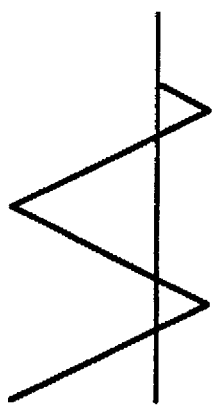
FIG. 2 is a diagram of a scan current waveform having a right raster shift applied.

To shift the video raster to the right, points A and B must be shifted upward, corresponding to the addition of a positive DC current to the current of FIG. 1. The resulting scan current waveform is shown in FIG. 2. To shift the video raster to the left, points A and B must be shifted downward, corresponding to the addition of a negative DC current to the current of FIG. 1. The resulting scan current waveform is shown in FIG. 3.

Figure 3:
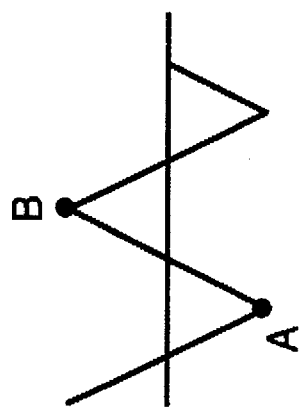
FIG. 3 is a diagram of a scan current waveform having a left raster shift applied.
Figure 4:
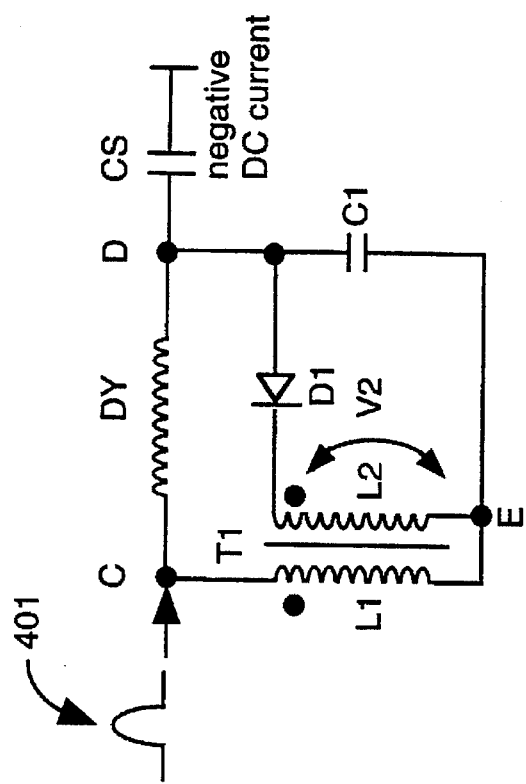
FIG. 4 is a diagram of a circuit for producing a scan waveform having a negative DC current (like that of FIG. 3)

Referring now to FIG. 4, there is shown a circuit for producing a scan waveform having a negative DC current (like that of FIG. 3). The DY coil is connected through a capacitor CS to ground. During retrace, a retrace voltage 401 is produced at node C. A transformer T1, composed of a primary coil L1 and a secondary coil L2, is connected to node C and is connected also, through a diode D1, to node D. The transformer T1 performs two functions: a) it provides a path to inject the DC current; and b) it blocks the high H-retrace voltage from entering the H-shift circuitry.

Preferably, the inductance of L1 is about 10 times higher then the impedance of the DY coil in order to keep the (in principle) unwanted H-scan current low and hence losses low. The turn ratio of L1/L2 is determined by the desired value for the raster shift. A voltage V2 is generated by the inductor L2 and impressed across a capacitor C1 connected between node D and node E, common to L1 and L2. This voltage generates the DC current through the DY coil of the deflection yoke.

Figure 5:
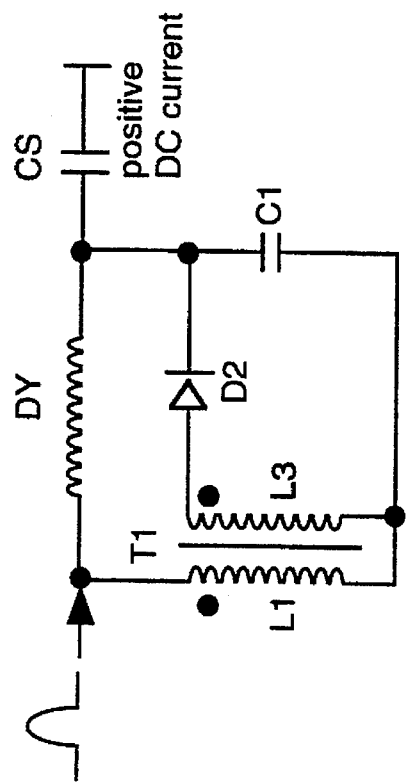
FIG. 5 is a diagram of a circuit for producing a scan waveform having a positive DC current (like that of FIG. 2)

A corresponding circuit for producing a scan waveform having a positive DC current (like that of FIG. 2) is shown in FIG. 5. Note that the direction of the diode D2 is reversed as compared to the diode D1 of FIG. 4. In practice, the DC resistance of the coils L1/L2/L3 should be low so to avoid losses which are generated by the injected DC current.

In FIG. 4 and FIG. 5, the capacitor C1 acts as a smoothing capacitor. The voltage across the capacitor C1 is a DC voltage. Furthermore, during a scan period, the shift current is constant due to the filtering effect of the capacitor C1.

Figure 6:
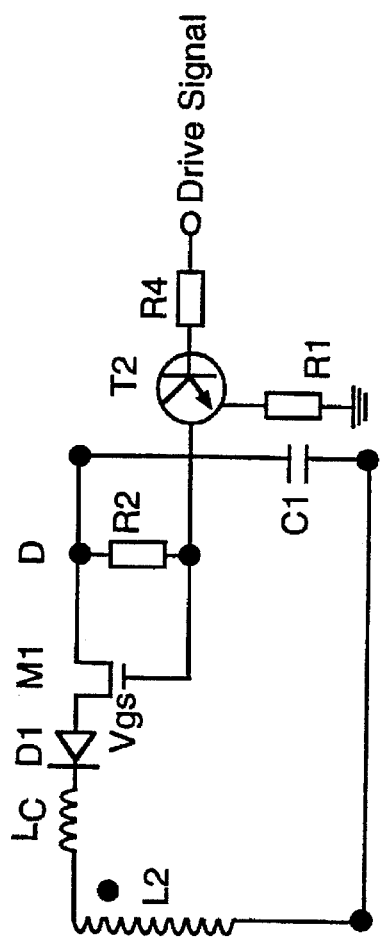
FIG. 6 is a diagram of a circuit for producing a scan waveform having a negative DC current where the amount of DC current is precisely controllable.

Referring to FIG. 6, in order to render the DC current controllable using a digital control signal, a power MOSFET M1 is inserted into the DC current loop of the circuit of FIG. 4, preceding the diode D1. The gate and drain of the MOSFET are connected by a resistor R2. A bipolar transistor T2 having its base coupled through a resistor R4 to a digital drive signal is used to control the MOSFET M1. The emitter of the transistor T2 is connected through a resistor R1 to ground.

In addition, a compensating coil Lc is connected between the diode D1 and the inductor L2. The inductor Lc is added to undo the effect of raster shift current being frequency dependent, or at least reduce such frequency dependence to the point of it being negligible.

In operation of the circuit of FIG. 6, the current through L1 and C1 generates across L2 a voltage V2 given by the equation V2=Vtrace(L1/L2). Through the diode D1 the trace voltage is rectified. The N-channel MOSFET M1 acts as a switch and is controlled by a synchronized H-clock signal.

Figure 7:
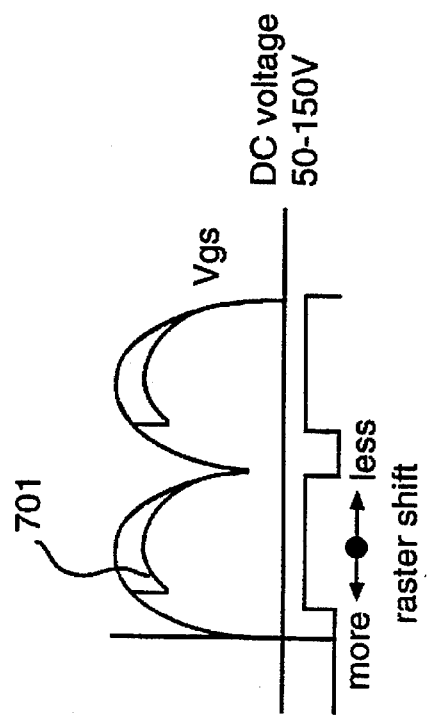
FIG. 7 is a waveform diagram illustrating a manner in which the amount of DC current in FIG. 6 and hence the amount of raster shift is controlled.

The circuit of FIG. 6 provides a simple solution to the problem of how to switch on at an arbitrary time a MOSFET whose source voltage is widely varying. This situation is shown in FIG. 7, illustrating the voltage Vgs of the MOSFET M1 and, in phantom, the voltage at node D.

The objective satisfied by the circuit of FIG. 6 is to generate a gate control signal for the transistor switch M1, which will not be affected by the modulation of the transistor's drain/source voltage by the S-correction and Scan-supply voltage rail which can vary from 50 V to 150 V depending on the horizontal scan frequency.

(S-correction is required to symmetrically modulate the H-scan current through the deflection coils, to correct raster distortion introduced due to the radius of the CRT face.)

In operation, this objective is accomplished as follows. A 5 volt peak to peak control signal is applied via the resistor R4 to the base of the transistor T2. The collector current of the transistor T2 will generate across the resistor R1 the necessary voltage Vgs to switch the N-channel MOSFET M1 on and off. By choosing the value of the resistor R1 to be two times that of the resistor R2, a negative voltage Vgs of about 9 V will be generated. With this arrangement, the drain voltage can float freely without affecting the Vgs voltage.

The timing of the control signal is designed to keep the transistor M1 off during retrace and to increase the DC current by advancing the leading negative edge of the voltage Vgs (701 in FIG. 7) towards the start of the trace period. The maximum current will be generated by having the transistor M1 on during a complete trace period. The DC current is decreased by delaying the edge 701 further from the start of the trace period. In this manner, the conduction time of the transistor M1 can be varied from zero to full on, and the available raster shift current can be varied from 0 to about 1A.

Figure 8:
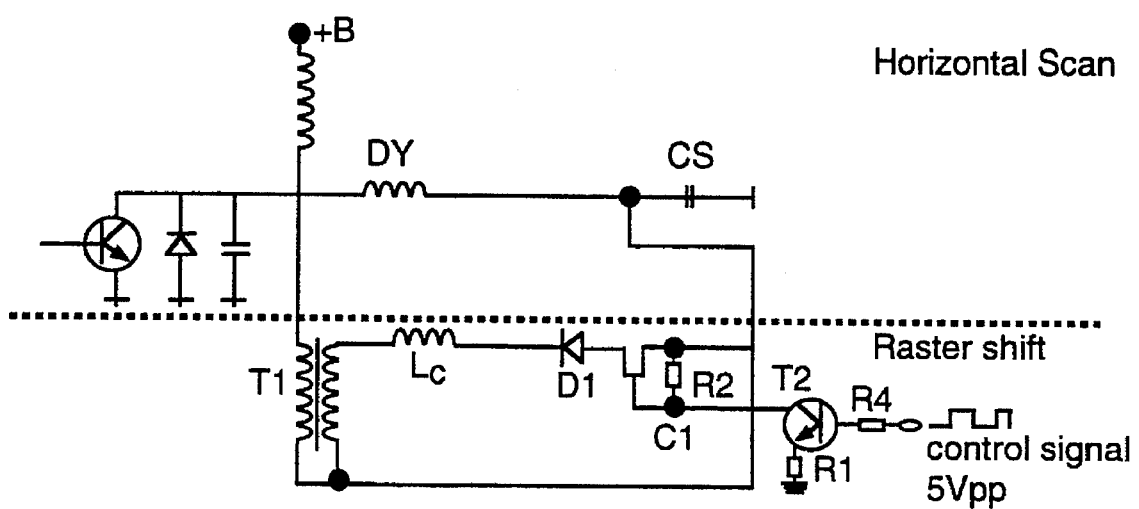
FIG. 8 is a diagram showing in a lower portion thereof the circuit of FIG. 6, in relation to a conventional horizontal scan circuit (upper portion)

A horizontal scan circuit incorporating the raster shift circuit of FIG. 6 is shown in FIG. 8.

The foregoing circuit generates a negative voltage across C1. In order to provide a bi-directional DC current through the deflection yoke, both a positive and negative voltage across C1 are needed. A positive voltage could be generated by using another output winding and a P-channel switch; however the drive circuitry would be more complicated in that a positive gate control voltage with respect to the floating source voltage would be needed.

An attractive alternative is to use the same circuit approach for generating the positive voltage across C1. In the horizontal scan circuit of FIG. 9, left raster shift is achieved using the circuit of FIG. 6, and right raster shift is achieved using a corresponding circuit 901 including a switch M2 and a diode D2. By having the switch M2 output connected to the opposite side of C1 and having the polarity of L3 set to generate a negative voltage, the net result is a positive voltage across C1 which in turn will drive a positive current through the deflection yoke. The compensation coils Lc1 and Lc2 may be wound on a single ferrite core for cost reduction, as at any given time only one current path is in operation.

To control the pulse widths of the control signals for each of the transistors M1 and M2, a PWM signal is generated by a microcontroller. To get a stable raster shift the PWM signal needs to be synchronized with the H sync signal. Also to have an adequate resolution, the PWM clock must be high, about 80 times the incoming H sync frequency in a preferred embodiment. In principle, this clock could be generated by the microcontroller itself, but this approach would significantly increase the cost of the microcontroller. However if an on-screen display (OSD) chip is used in the monitor, then the required clock may be obtained from the OSD chip at no additional cost.

Figure 9:
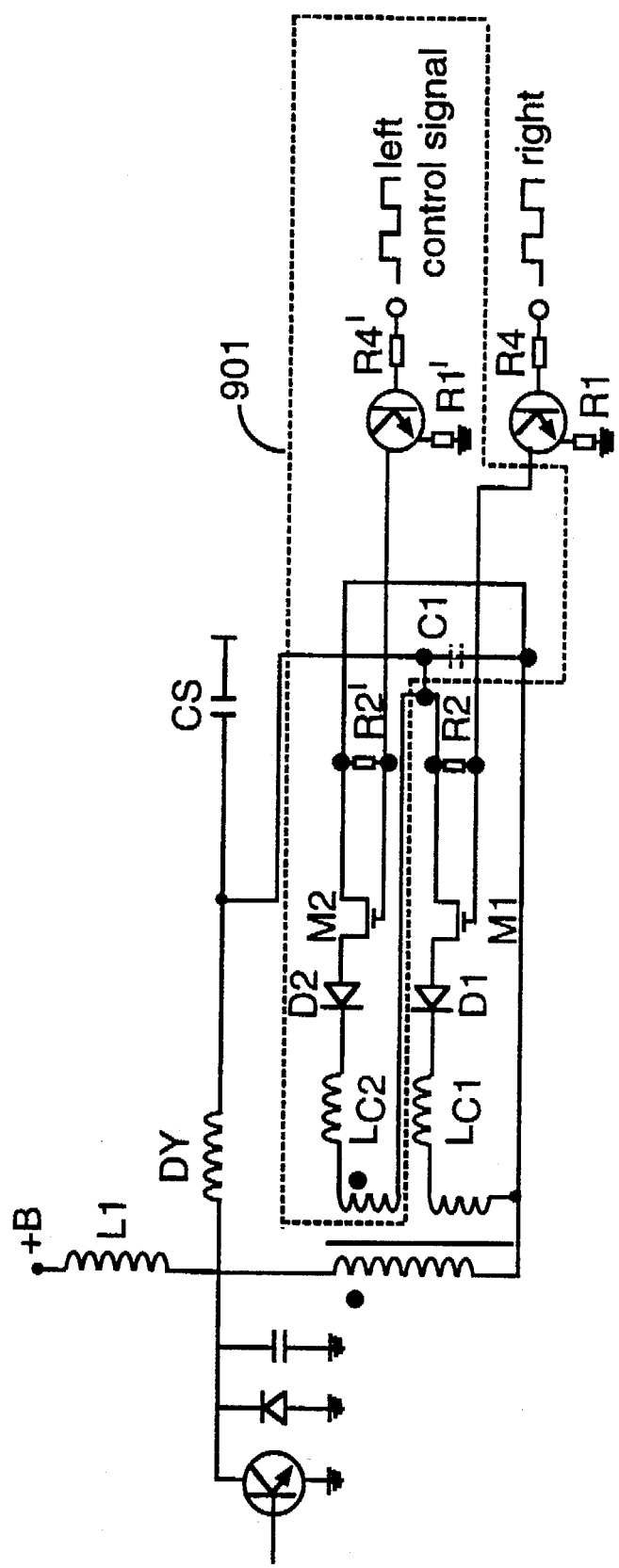
FIG. 9 is a diagram of a horizontal scan circuit in which left raster shift is achieved using the circuit of FIG. 6 and right raster shift is achieved using a corresponding circuit.
Figure 10:
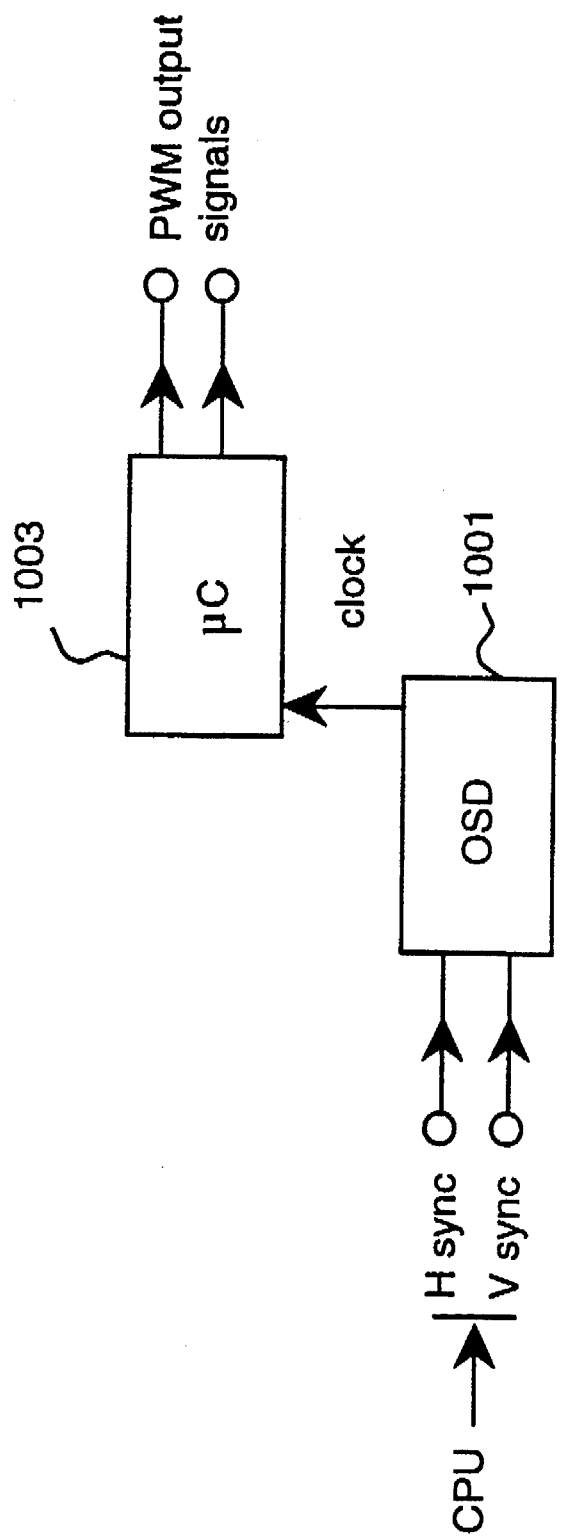
FIG. 10 is a block diagram showing a manner in which control signals for the circuit of FIG. 9 are generated.

Referring to FIG. 10, the manner in which control signals for the circuit of FIG. 9 are generated is shown in greater detail. An OSD chip receives horizontal and vertical sync signals H and V from a CPU. In response to the H sync signal, the OSD generates a clock signal that is locked to and has a frequency that is a large multiple of the H sync frequency. This frequency is supplied to a microcontroller 1003 used to generate two PWM output signals, one to control left raster shift and one to control right raster shift. By using the already available synchronized clock from the OSD chip to generate the horizontal-locked PWM control signal, which can then be used for H-scan raster shift, the expense of the additional circuitry required for raster shift may be significantly decreased.

A raster shift amount is input to the microcontroller 1003 and stored in an internal register (not shown). The register value can be changed by the user, by a system alignment process, and by a control program of the microcontroller 1003 itself, which program may call for a specific amount of raster shift in a particular frequency mode.

Using the principles and techniques described above, the video raster may be shifted by amounts that are precisely, digitally controlled. This feature may be used to advantage in other ways not usually associated with raster shifting. For example, DC shift can be used to virtually modulate the H scan current to achieve parallelogram correction.

It will be appreciated that the present invention can be embodied in other specific forms without departing from the spirit or essential character thereof. The disclosed embodiments are therefore considered in all respects to be illustrative and not restrictive. The scope of the invention is indicated by the appended claims, and all changes which come within the meaning and range of equivalents thereof are intended to be embraced therein.

What is claimed is:

1. For use in a video display monitor having a horizontal deflection circuit including a horizontal deflection coil across which is generated a periodic retrace voltage, raster shift apparatus for shifting a display image on a CRT screen of the display monitor by establishing a controlled DC current in the horizontal deflection coil comprising:

a storage capacitor;

means responsive to said retrace voltage for charging said storage capacitor to a charging voltage; and switching means responsive to a raster shift control signal for applying said charging voltage to said horizontal deflection coil to cause a controlled DC current to flow in said deflection coil; and a controller for generating as said raster shift control signal a pulse width modulated signal.

2. The apparatus of claim 1, wherein said switching means comprises first means for applying said charging voltage to said horizontal deflection coil with a first polarity and second means for applying said charging voltage to said horizontal deflection coil with a second polarity.

3. The apparatus of claim 2, wherein said means for charging comprises a transformer including a secondary coil, said secondary coil being connected to said storage capacitor.

4. The apparatus of claim 3, wherein said means for charging further comprises a diode connected between said secondary coil and said storage capacitor.

5. The apparatus of claim 3, wherein first means for applying comprises an electronic switch connected between said storage capacitor and said diode and first control means connected to said electronic switch for, responsive to said control signal, turning said electronic switch on and off.

* * * * *